Nov. 8, 1949  E. R. WILLIAMS  2,487,501
AUTOMATIC SHUTOFF VALVE
Filed July 24, 1947
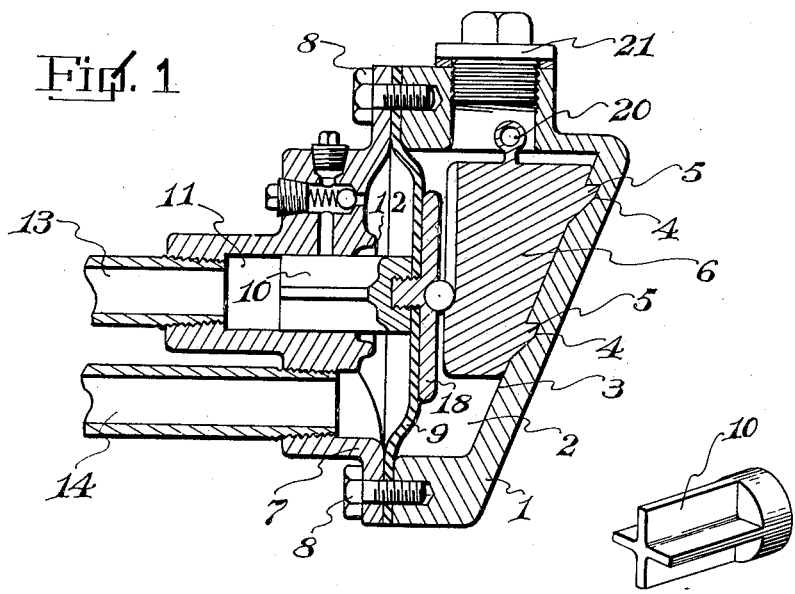
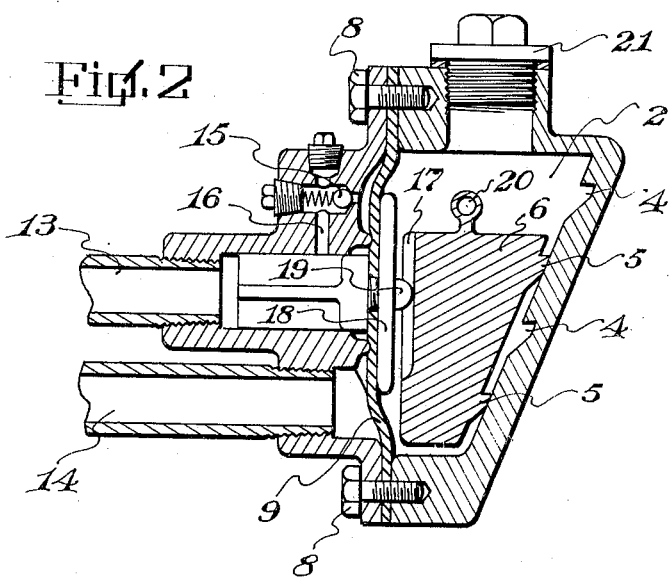
Elmer R. Williams
INVENTOR.
BY Philip A. N. Farell
ATTORNEYS.

Patented Nov. 8, 1949

2,487,501

UNITED STATES PATENT OFFICE 2,487,501

AUTOMATIC SHUTOFF VALVE

Elmer R. Williams, Tulsa, Okla.

Application July 24, 1947, Serial No. 763,227

6 Claims. (Cl. 137—153)

The invention relates to automatic shut-off valves, and has for its object to provide a device of this kind wherein the valve is maintained open, by pressure flowing through the line, and when the pressure drops below a predetermined amount the valve is closed and maintained closed by a gravity operated weight.

A further object is to provide an automatic cut-off valve comprising a diaphragm in a casing cooperating with a valve seat, and a wedge shaped gravity actuated member in the casing and cooperating with an inclined surface in the casing for seating and maintaining the diaphragm valve seated on its seat when the pressure reaches a predetermined low.

A further object is to provide a check by-pass valve on the intake side of the diaphragm for allowing reverse movement of the pressure into the intake line in case of expansion of the fluid where the device is used in the open and subjected to heat.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical longitudinal sectional view through the shut-off valve showing the same in open position.

Figure 2 is a view similar to Figure 1, but showing the valve closed.

Figure 3 is a perspective view of the diaphragm guide member.

The device is particularly adapted for use in connection for out door storage tanks for gas or fluids. It is to be understood the device can be used in any position desired, for instance in connection with gas lines leading to gas equipment, in homes, factories or other places.

Referring to the drawing, the numeral 1 designates the diaphragm valve casing, which casing is provided with a chamber 2, formed by the downward and inwardly extending weight slide wall 3. Slide wall 3, at spaced points, is provided with transverse notches 4 which receive the similarly shaped ribs 5 on the outer face of the wedge shaped gravity actuated weight 6.

Clamped between the casing 1 and the flanged member 7, forming part of the casing, by means of bolts 8, is a diaphragm valve 9. Diaphragm valve 9 is guided by a rib guide member 10 in the intake opening 11 and the diaphragm cooperates with an annular seat 12 around the intake opening 11, for shutting off, or allowing the flow of gas or fluid from the intake pipe 13. The gas flows through pipe 13, under pressure, and maintains the diaphragm unseated as shown in Figure 1 and then passes outwardly through the outlet pipe 14 to the point of consumption.

When the device is used in the open it has been found that the hot sun will cause the gas in the line 14 to expand, and this pressure is relieved when the valve is closed, as shown in Figure 2, by the unseating of the check valve 15, and the additional pressure will then pass through the port 16 and line 13 back to the storage tank.

The inner face of the gravity actuated weight 6 is provided with a vertical ball raceway 17, and interposed between the ball raceway and the diaphragm disc 18, is a ball bearing 19, thereby eliminating any drag and reducing the frictional engagement of the weight in its downward movement by gravity. Ribs 5 also reduce the frictional engagement of the weight with the wall 3 of the casing.

The upper end of the weight 6 is provided with an eye 20 for the reception of a tool for pulling the weight upwardly when pressure is resumed, after a cut-off operation. It will be noted that the resetting is a manual one, consequently can be reset after the pressure has been resumed by simply removing the cap 21 from the upper end of the casing.

It will be noted that when the device is in set position, as shown in Figure 1, that the outward pressure on the diaphragm will maintain a weight 6 in raised position. When the pressure drops to a dangerous low the diaphragm moves to the left and the gravity actuated weight moves downwardly to the position shown in Figure 2, thereby cutting off the flow of gas from intake pipe 13 to outlet pipe 14.

The invention having been set forth what is claimed as new and useful is:

1. A weight actuated cut-off valve, said valve comprising a casing, an intake port carried by said casing and having a valve seat surrounding the same, a diaphragm valve within said casing and cooperating with said seat, said diaphragm valve being in a vertical plane, a gravity actuated wedge-shaped weight member within the casing on the opposite side of the diaphragm from the seat, the outer wall of the casing inclining downwardly and inwardly towards the diaphragm, said wedge shaped weight member being disposed within the casing between the inclined wall and the diaphragm valve and forming means whereby the weight member will move downwardly by gravity upon reduction of pressure on the opposite side of the diaphragm, said weight member being held against downward movement by the diaphragm and pressure thereon.

2. A device as set forth in claim 1 including an anti-frictional bearing interposed between the diaphragm and the adjacent side of the weight member.

3. A device as set forth in claim 1 including an anti-frictional bearing interposed between the diaphragm and the weight member, said bearing having one of its sides disposed in a vertical ball raceway in the weight member.

4. A device as set forth in claim 1 including an anti-frictional bearing interposed between the diaphragm and weight member, said weight member having transverse bevelled ribs disposed in similarly shaped transverse grooves in the inclined wall of the casing when the weight member is in raised position.

5. A device as set forth in claim 1 including a back pressure by-pass valve to the intake port from the outlet.

6. A device as set forth in claim 1 including a flanged guide member carried by the diaphragm and slidably mounted in the intake port.

ELMER R. WILLIAMS.

REFERENCES CITED

The following references are of record in the file of this patent:

UNITED STATES PATENTS

| Number | Name | Date |
|---|---|---|
| 1,553,806 | Econopouly | Sept. 15, 1925 |
| 1,712,346 | Homesley | May 7, 1929 |

FOREIGN PATENTS

| Number | Country | Date |
|---|---|---|
| 366,829 | Great Britain | May 14, 1931 |